United States Patent [19]
Tiedemann, Jr. et al.

[11] Patent Number: 5,642,398
[45] Date of Patent: Jun. 24, 1997

[54] COMPREHENSIVE MOBILE COMMUNICATIONS DEVICE REGISTRATION METHOD

[75] Inventors: Edward G. Tiedemann, Jr.; Gadi Karmi; Frank Quick, all of San Diego, Calif.

[73] Assignee: Qualcomm Incorporated, San Diego, Calif.

[21] Appl. No.: 536,581

[22] Filed: Sep. 29, 1995

Related U.S. Application Data

[62] Division of Ser. No. 370,711, Dec. 23, 1994, abandoned, which is a continuation of Ser. No. 26,899, Mar. 5, 1993, abandoned, which is a continuation-in-part of Ser. No. 763,091, Sep. 20, 1991, Pat. No. 5,289,527.

[51] Int. Cl.$^6$ ...................................... H04Q 7/20
[52] U.S. Cl. .................. 379/57; 379/59; 455/33.1
[58] Field of Search .................. 379/58, 57, 59, 379/63, 60; 455/33.1, 33.2, 33.3, 33.4, 54.1, 54.2, 56.1

[56] References Cited

U.S. PATENT DOCUMENTS

| | | |
|---|---|---|
| 4,112,257 | 9/1978 | Frost . |
| 4,475,010 | 10/1984 | Huensch et al. . |
| 4,765,753 | 8/1988 | Schmidt ........................ 379/60 |
| 4,775,999 | 10/1988 | Williams ....................... 379/59 |
| 4,876,738 | 10/1989 | Selby . |
| 4,977,399 | 12/1990 | Price et al. ................ 340/825.44 |
| 5,042,082 | 8/1991 | Dahlin . |
| 5,043,736 | 8/1991 | Darnell et al. ............... 342/357 |
| 5,054,110 | 10/1991 | Comroe et al. . |
| 5,097,499 | 3/1992 | Cosentino ..................... 379/59 |
| 5,127,100 | 6/1992 | D'Amico et al. ............ 455/33.1 |
| 5,159,596 | 10/1992 | Itoh ............................. 370/95.1 |
| 5,212,822 | 5/1993 | Fukumine et al. ........... 455/33.1 |
| 5,241,598 | 8/1993 | Raith ............................ 380/21 |
| 5,289,527 | 2/1994 | Tiedemann, Jr. ............. 379/59 |
| 5,305,466 | 4/1994 | Taketsugu .................... 379/59 |
| 5,345,500 | 9/1994 | Breeden et al. .............. 379/63 |
| 5,369,681 | 11/1994 | Boudreau et al. ........ 379/59 X |
| 5,396,496 | 3/1995 | Ito et al. ...................... 370/50 |

FOREIGN PATENT DOCUMENTS

| | | | |
|---|---|---|---|
| 0199266 | 10/1986 | European Pat. Off. | ......... H04Q 7/04 |
| 0439628 | 8/1991 | European Pat. Off. | ......... H04Q 7/04 |
| 2193861 | 2/1988 | United Kingdom | ............. H04Q 7/04 |
| 2243976 | 11/1991 | United Kingdom | ............. H04Q 7/04 |

OTHER PUBLICATIONS

"A Location Registration Procedure for Next Generation Mobile Communications", Ieice Spring National Convention, Teruma et al., No. B863, 1989, p. 2-367.

*Primary Examiner*—Curtis Kuntz
*Assistant Examiner*—Michael B. Chernoff
*Attorney, Agent, or Firm*—Russell B. Miller; Katherine W. White; Brian S. Edmonston

[57] ABSTRACT

A comprehensive method for mobile station registration in a cellular communication system wherein registrations are made due to multiple stimulus. Registration can occur as a function of distance traveled since the previous registration. Registration can occur due to entering the coverage area of a base station assigned to a zone in which the mobile station has not recently registered. A registration timer can be used to ensure a minimum time between registrations. Registrations can occur at power up and at power down. The mobile station can be ordered to register by a transmission from a base station. Registration can occur due to parameter changes with in the mobile station. Registration may also occur through necessary communication with a base station which is not expressly directed to registration.

18 Claims, 2 Drawing Sheets

COMPREHENSIVE MOBILE COMMUNICATIONS DEVICE REGISTRATION METHOD

RELATED APPLICATIONS

This is a divisional of 08/370,771, filed Dec. 23, 1994, abandoned, which is a continuation of 08/026,899, filed Mar. 5, 1993, abandoned, which is a continuation-in-part of U.S. patent application Ser. No. 07/763,091 filed Sep. 20, 1991, now U.S. Pat. No. 5,289,527.

BACKGROUND OF THE INVENTION

1. Field of the Invention

The present invention relates to communications. More particularly, the present invention relates to a novel and improved method for registration of a mobile communications device in a cellular communications environment.

2. Description of the Related Art

In a cellular communication system registration is the process a mobile station uses to notify a cellular communication system whether it is on the air and which base station it is receiving. The mobile station may be of a cellular radiotelephone or personal communication device typically in the form of a vehicle mounted trait or a hand carried portable unit. For calls that are directed towards a mobile station, the cellular system uses the registration information to reduce the amount of paging by determining whether to page a mobile station and, if so, by determining the set of base stations in which to broadcast the page.

For calls directed to a mobile station, often called mobile terminated calls, the land system must determine whether the mobile station is powered on and which base station the mobile station is receiving. To find the mobile station, the cellular system broadcasts a message, often called a page, from many base stations. If the mobile station responds, the cellular system continues handling the call with further communication being directed to the base station of the coverage area in which the mobile station is located. It should be further understood that the paging process is used to locate the mobile station for any other transaction to be done with the mobile station. The base station and its coverage area are commonly referred to as a cell.

If the system has no knowledge of the location of the mobile station, then the system must broadcast pages in every sector of every base station. As the amount of mobile terminated traffic increases, the communications resources to support system wide paging quickly becomes enormous in most large metropolitan areas.

A mobile station uses a process called registration to inform the cellular system where the mobile station is located. Well known methods of registration in the art include registration at power up, and registration upon entering each new base station coverage area, among many others. Several systems, such as AMPS and GSM, use a periodic or counter method to determine the location of the mobile station. The counter method is similar to the timer method described herein. Although these methods are far from ideal, they nevertheless can significantly reduce the amount of required paging.

An analysis of the timer method assumes the uniform hexagonal tessellation of the plane or uniform circular base station coverage areas with radius $r_c$. The same expected number of mobile stations, given by $N_a$, is assumed to be in every base station coverage area.

In a cellular system implementing the timer method each mobile station registers every $T_r$ seconds. This requirement can be easily implemented by having the mobile station increment a counter periodically, or increment a counter in response to a global command from the system. By either supplying the maximum value of the counter or varying the increment rate, the system can vary $T_r$. The average registration message rate, $\lambda_{reg}$, per base station is thus given by the following equation:

$$\lambda_{reg} = \frac{N_a}{T_r}. \tag{1}$$

For a mobile terminated call, the system needs to determine the set of base station coverage areas that the mobile station may have entered. If the mobile station can move at some maximum velocity $v_m$, then the distance that the mobile station could have traveled is $v_m(t-t_r)$ where $t_r$ is the time when the mobile station last registered. Unless the system knows where in the base station coverage area the mobile station was located when it registered, the system must assume that the mobile station was on the coverage area boundary. Unless the system has some direction information, it must assume that the mobile station was moving outward.

For a randomly chosen mobile station, the expected number of base stations that must page can readily be found. The elapsed time since registration is a uniformly distributed random variable on $[0, T_r]$. Rather than considering the exact result which is discontinuous in the distance, more insight can be obtained by considering a quadratic approximation to the number of base stations as function of the distance. The expected number of base stations that the mobile station must be paged in, $M_s$, is in accordance with the equation:

$$\overline{M}_s = 2 + \sqrt{3} + \left(1 + \frac{\sqrt{3}}{2}\right) T_r \left(\frac{v_m}{r_c}\right) + \frac{1}{3} T_r^2 \left(\frac{v_m}{r_c}\right)^2. \tag{2}$$

The quantity $r_c/v_m$ is the time that a mobile station moving at velocity $v_m$ takes to move from the center of a coverage area to its boundary. If the excess outbound message rate is defined as the expected number of pages other than the answered page plus the expected number of messages that must be sent to acknowledge registrations, then the excess outbound message rate, $\lambda_{ex}$, is determined by the equation:

$$\lambda_{ex} = N_a \lambda_m \alpha_t (\overline{M}_s - p_p) \frac{1 - (1-p_p)^{M_p}}{p_p} + \lambda_{reg}. \tag{3}$$

where:

$M_p$ is the number of times that a page message is repeated;

$p_p$ is the probability that the page is answered by the mobile station on a particular page repetition; and $N_a \lambda_m \alpha_t$ is the origination rate for mobile terminated cats in a base station coverage area.

As the interval between registrations, $T_r$, decreases, the number of base stations that must page decreases, but the acknowledgment rate increases. Thus some value of $T_r$ minimizes $\lambda_{ex}$.

The main problem with the timer method is that paging must be done in an area commensurate with the maximum vehicle velocity. If the region has a few routes that allow high velocity, then the system must use the highest velocity route for determining where to page. Portable units, which normally don't move very fast, may nevertheless be in a fast moving vehicle and cannot be counted as a separate class. Techniques which begin paging in a small region and then expand the paging region if the mobile station does not respond can be used to reduce the amount of paging at the expense of delay.

Another registration technique known as the zone based method is also used to reduce the amount of paging in a cellular system. The zone based method may simply divide the system into regions called zones. Thus, base stations are grouped together to form fixed paging zones. Upon registration in a zone, the mobile station is paged from all base stations within the zone. The mobile station typically maintains a list of zones that it has recently visited. If the mobile station enters a zone not on the list, it then registers. Therefore as the mobile station travels throughout the system, it registers each time it travels into a new zone.

A variation of the basic zone based method is described in the article entitled "A New Location Updating Method for Digital Cellular Systems," by Okasaka, Sadaatsu, Onoe, Seizo, Yasuda, Syuji, and Maebara, Akihiro, Proceedings of the 41st IEEE Vehicular Technology Conference, St. Louis, Mo., May 19–22, 1991, pp. 345–350. In this variation of the zone based method, layers of zones are created along with the group of mobile stations divided by parameters, such as mobile station serial number, into which layer of zones the mobile station will register.

An analysis of the zone based method again assumes the uniform hexagonal tessellation of the plane or uniform circular base station coverage areas with radius $r_c$. The same expected number of mobile stations, again given by $N_a$, is assumed to be in every base station coverage area.

As mentioned above, in the zone based method every coverage area in a system is assigned to a specific fixed zone. Every base station broadcasts the zone to which it is assigned. The mobile station keeps a list of zones that it has recently visited. Whenever a mobile station enters a zone not on its list, the mobile station registers and adds the zone to the list.

Vehicular traffic theory can used to estimate the expected peak registration rate for a perimeter base station coverage area. If the coverage area is dominated by one or two main roadways, the rate is relatively easy to compute; otherwise, the computation can be quite tedious. A well known result is that the maximum capacity per lane of traffic on a well designed freeway is about 2000 vehicles per hour and occurs with vehicles moving about 50 km/hour. Good rule of thumb adjustments have been developed for other roadways. If the fraction of vehicles equipped with cellular telephones is known, then the expected peak registration rate can be obtained. For example, if 25% of the vehicles traveling on an 8 lane freeway were equipped with cellular telephones, then the expected peak registration rate for a perimeter base station would be 0.56 registrations per second.

One shortcoming of the zone based method arises in the case of where a heavily traveled route, such as a freeway, intersects a zone boundary. In this instance, all mobile stations register in the base station coverage areas on the zone boundary through which the freeway passes. This situation can place a severe loading on the resources of these particular base stations. One attempt to resolve this problem is to create a staggered or layered zone arrangement as mentioned above. In the fixed staggered zone arrangement, overlapping zones are created in which the particular zone a mobile station registers in is also a function of a serial or identification number of the mobile station. Such a scheme adds a further level of complexity and may not adequately distribute registrations amongst the base stations. It also does not create the hard boundaries necessary between areas administrated by different entities.

A third registration technique known as the distance based method is used to further reduce the amount of paging in a cellular system. The mobile station registers when the distance between the current base station and the base station in which it last registered exceeds a threshold. The mobile station computes a distance measure based on the difference in latitude and longitude between the current base station and the base station where the mobile station last registered. If this distance measure exceeds the threshold value, the mobile station registers with the current base station.

While there are several ways to mechanize this method, a simple way that gives sufficient accuracy has all base stations broadcast latitude (lat), longitude (long), and distance ($d_r$) parameters. The mobile station registers whenever:

$$d_r \leq \sqrt{(\Delta lat)^2 + (\Delta long)^2} \qquad (4)$$

where:

$d_r$ is the distance parameter transmitted by the base station in which the mobile station last registered.

Furthermore, $$\Delta lat = \text{new lat} - \text{registered lat; and} \qquad (5)$$

$$\Delta long = (\text{new long} - \text{registered long}) \cos(\pi/180 \text{ registered lat}); \qquad (6)$$

where:

new lat and new long are respectively the latitude and longitude in degrees of the base station of the coverage area in which the mobile station is located; and registered lat and registered long are respectively the latitude and longitude in degrees of the base station in which the mobile station last registered.

It should be noted that in equation (6) the cosine factor compensates for the merging lines of longitude as the latitude increases. A more basic approximation of the distance can be achieved be eliminating the cosine factor from equation (6). However without the cosine factor the approximation becomes more inaccurate as the latitude increases. It should be further understood that the distance parameter $d_r$ is typically supplied by the base station where the mobile station last registered. However, in the alternative the distance parameter may be a fixed value stored at the mobile station. It should be further understood that although equations (4)–(6) relate to registrations during the travels of the mobile station, the mobile station also typically registers upon an initial power-up in the system.

The difference between the values (new long) and (registered long), and the difference between the values (new let) and (registered lat) are respectively typically small for a cellular communications system. Consequently, the approximation set forth by equations (4)–(6) is quite accurate. Errors are less than 1% compared to an exact method, described below, for base station separations up to 200 miles.

In addition, the trigonometric function in equation (4) can be easily approximated by a table lookup function. The square root of the sum of the squares can be approximated by any of several well known approximation methods. One such approximation is:

$$x = \max(|\Delta lat|, |\Delta long|); \text{ and} \qquad (7)$$

$$y = \min(|\Delta lat|, |\Delta long|) \qquad (8)$$

where:

$$\text{for } 0 \leq y \leq \frac{x}{4}: \quad \text{distance} = x + \frac{1}{8}y; \text{ and} \quad (9)$$

$$\text{for } \frac{x}{4} \leq y: \quad \text{distance} = \frac{7}{8}x + \frac{1}{2}y \quad (10)$$

The approximation of equations (7)–(10) supplies a peak error of less than 3% and average RMS errors of about 1%. The approximation can be computed quickly by using shifts, adds, subtractions, and compares in a microprocessor. Other approximations can supply greater (or less) accuracy with additional (or less) computation.

A 64 entry table lookup for the cosine function in equation (6) plus the approximation in equations (7)–(10) to the square root of the sum of the squares for equation (4) gives errors less than 6% for base station latitudes of less than 60 degrees.

As mentioned above, the use of equations (4)–(10) are an approximation to the exact method of computing distance between base stations. An exact method of computing distance for a circular earth model can be defined by the following equations (11)–(16). The exact distance method has the mobile station register again if:

$$d_r \leq \text{distance} \quad (11)$$

where:

$$\text{distance} = \frac{180}{\pi} \sqrt{(-\sin\phi\cos\theta + \sin\alpha\cos\beta)^2 + (\cos\phi\cos\theta + \cos\alpha\cos\beta)^2 + (\sin\theta - \sin\beta)^2} \quad (12)$$

$$\phi = \frac{\pi \text{ new long}}{180}; \quad (13)$$

$$\theta = \frac{\pi \text{ new lat}}{180}; \quad (14)$$

$$\alpha = \frac{\pi \text{ registered long}}{180}; \text{ and} \quad (15)$$

$$\beta = \frac{\pi \text{ registered lat}}{180}. \quad (16)$$

In the above equations (4)–(16) the parameters new long, new lat, registered long and registered lat, are given in degrees. Further information on distance based registration is disclosed in a co-pending U.S. patent application Ser. No. 07/763,091, entitled "MOBILE COMMUNICATIONS DEVISE REGISTRATION METHOD," filed Sep. 20, 1991, and assigned to the Assignee of the present invention, cited above.

For purposes of analysis of the distance method, a homogeneous network of base stations coverage areas such as illustrated in FIG. 3 is considered. Assuming homogeneous vehicle movement in the network, semi-Markov techniques can be used to determine the expected registration rate. While movement from coverage area to coverage area is ordinarily a very complicated stochastic process, a simple model can be obtained by assuming a first order Markov chain with the mobile station entering any of the surrounding base station coverage areas with probability equal to ⅙.

As described in further detail in the above mentioned co-pending application, the registration rate for the distance method tends to be less than for the zone method. A lower excess outbound rate is realized for the distance method because a circular region, or "floating zone," is built around the base station where the mobile station last registered.

With the zone method, the mobile station has a shorter expected distance to traverse before entering a new zone if it registers in a perimeter base station. In practice, there are multiple zones on a zone list. A zone list comprising multiple zones is employed so that the mobile station does not register multiple times as it flips between base stations along the zone boundary. Consequently, the system may have to page the mobile station in multiple zones. This results in the distance method being even more favorable when vehicular traffic follows the above discussed model.

In the zone method, the perimeter base stations of a zone have high registration rates while interior base stations have low registration rates. This can lead to an imbalance in the capacity of the base stations. By having multiple groups of mobile stations and staggering zones relative to each other for each group, the registration rate can be made more homogeneous in the network. However, this defeats the often desirable property of having a well defined zone boundary. Assuming a homogeneous network, the distance method has equal registration rates in all base stations. This will not strictly hold in most networks as mobile stations will tend to initialize registration in certain base stations.

Although the distance based method does provide an improvement over zone and timer registration methods in that there is a reduction in the number of pages transmitted by the base stations, it does not provide by itself a thorough registration scheme upon which a complex operating cellular system can be solely based. Therefore the present invention discloses a comprehensive registration method to reduce paging incorporating the three methods mentioned above with several other discrete registration methods providing a complete, reliable, and realizable scheme.

It is therefore an object of the present invention to provide in a cellular communication system a method by which mobile station pages may be reduced.

It is yet another object of the present invention to provide in a cellular communication system a comprehensive registration scheme which provides a complete and reliable paging mechanism.

It is a third object of the present invention to provide in a cellular communication system a comprehensive mobile station registration method by incorporating several discrete methods of registration into a complete registration scheme.

SUMMARY OF THE INVENTION

The present invention is a novel and improved method for mobile station registration in a cellular communication system. A comprehensive registration method is employed in which the mobile station registers based on a diverse set of criteria.

In a cellular communication system mobile stations are paged in the various base stations in order to identify the base station coverage area in which the mobile station is located for call routing purposes. A mobile switching center directs the page to base stations within a determined paging region for transmission. The mobile station, if within the region and in a condition to receive the pages, responds to the received page. The mobile station responds by transmitting a response message that is received by the base station for the coverage area in which the mobile station is located. The response to the page is relayed by the receiving base station to the mobile switching center. Thus the mobile switching center identifies the base station through which to direct further communication.

As the mobile station moves through the network it is desirable to limit the size of the paging region. Mobile station registration enables a group of base station coverage areas to be identified in which the mobile station would most likely be located. In using a registration method, paging for the mobile station need only be performed in the identified group of base stations. The present invention provides a comprehensive method for mobile station registration which provides for a reduction in the number of base stations which must transmit a page while reducing the number of registrations made by the mobile station.

In accordance with the comprehensive registration method of the present invention, a mobile station registers based on several different criteria. The mobile station can register autonomously or on command. The mobile station can register explicitly or implicitly. The mobile station can be automatically registered by a base station through which it is communicating.

Autonomic registration comprises the largest set of bases for registration. The mobile station can initially register autonomously at power-up. It can register autonomously due to a change in location either by a distance based registration initiated by entering a coverage area in which the corresponding base station is located more than a fixed distance from the base station where the mobile station last registered or by a zone based registration initiated by entering a coverage area in which the corresponding base station may not be administrated by the same entity of previous registrations. The mobile station can register autonomously when certain stored parameters change. When an extended period of time has elapsed without a registration, the mobile station can autonomously initiate a registration. The mobile station can also transmit an autonomic registration at power down.

The mobile station can register in response to a registration request order transmitted by the base station of the coverage area in which it is located. An implicit registration can occur upon receipt of an acknowledgment or other message transmitted by a base station. Also during a call, the mobile station can be registered by the base station through which it is communicating without sending a registration message thereto. In such a case, the mobile station can be notified to update appropriately.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

In a cellular communication system, some scheme is necessary to track the location and status of the mobile stations within the system. Without this knowledge, directing information toward a particular mobile station requires that a page, intended solely for the particular mobile station, be broadcast over all areas in some universal format to ensure that the particular mobile station is contacted. Using registration, the mobile station notifies the system controller or mobile switching center (MSC) of its status and location. The MSC records the information in a database and refers to the database upon receipt of a message intended for a particular mobile station to decide which base stations and format are used to relay the message to the particular mobile station.

Figure 1:
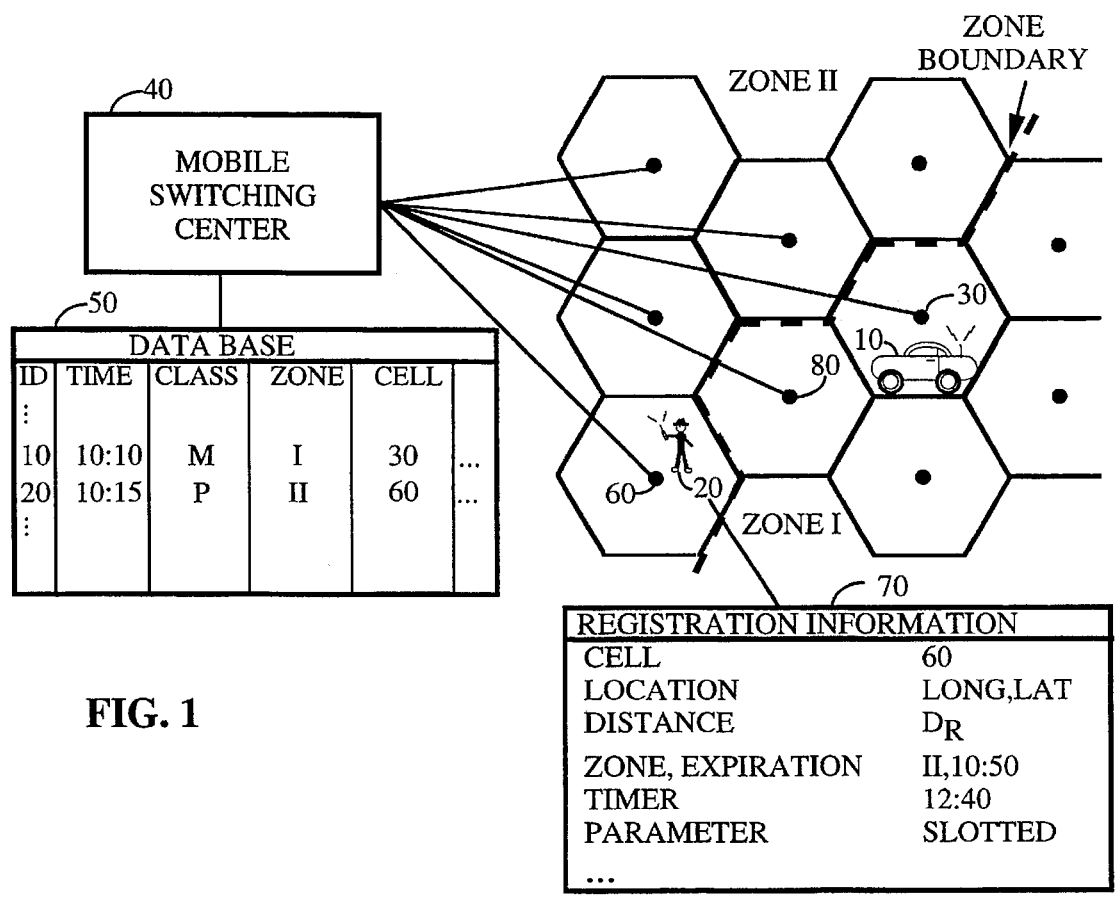
FIG. 1 is a diagram illustrating two mobile stations within an exemplary base station structure and corresponding mobile switching center.

Referring to FIG. 1, when mobile station 10 registers, it typically transmits, via its transceiver, identification parameters which, for example, may include mobile station serial number, associated telephone number or other addresses, mobile station slot cycle index, and mobile station classification. The registration information is received at a transceiver located at base station 30 for the coverage area in which mobile station 10 is located. The registration information is relayed to MSC 40 by receiving base station 30. (Although connections between each base station and MSC 40 in FIG. 1 are not shown to avoid cluttering the illustration, such connections are implied.) The information about mobile station 10 is stored along with information from other mobile stations in database 50. For example, mobile station 20 is another user of a different class and location than mobile station 10 for which information is also stored in database 50. In a common cellular scheme, database 50 may comprise a home location register for mobile stations assigned to the administrator of the MSC and a visitor location register for mobile stations that are roaming from their home MSC.

With respect to the exemplary base station coverage area structure illustrated in FIG. 1, and FIG. 3 introduced subsequently herein, it should be understood that in the actual cellular communication environment base station coverage areas may vary in size and in shape. It should further be understood that the base station coverage areas may tend to overlap with coverage area boundaries defining a coverage area shape different than the ideal hexagon shape. Furthermore, base stations may also be sectored such as into three sectors, as is well known in the art. The cellular system of FIGS. 1 and 3 may be an analog or digital communication system and employ one or more of several types of multiple access modulation schemes such as Code Division Multiple Access (CDMA), Time Division Multiple Access (TDMA) or Frequency Modulation (FM).

One function of MSC 40 is to route calls either from the Public Switched Telephone Network (not shown) or from other mobile stations to the various base stations which correspond to coverage areas in which the mobile stations are located as is well known in the art. Therefore MSC 40 also contains a database relative to the coverage area structure. Upon mobile station registration with a particular base station, MSC 40, using a processor and the coverage area structure database, determines a paging region. In an alternative embodiment, MSC 40 can determine the paging region when a call arrives for a particular mobile station.

When a call intended for transfer to mobile station 10 is received at MSC 40, MSC 40 initiates a mobile station page. MSC 40 instructs the base stations corresponding to the paging region of mobile station 10 to transmit a paging message. The paging message is used to alert mobile station 10 that a call has been placed thereto. If received, mobile station 10 responds to the paged message by transmitting a response message to base station 30. The response message is transferred by the receiving base station 30 to MSC 40.

The response message as transferred to MSC 40 by the receiving base station 30 is used by MSC 40 to determine the coverage area in which mobile station 10 is currently located. MSC 40 in coordination with receiving base station 30 directs the call to mobile station 10.

Since registration is often initiated by the mobile station, a database of registration information must also be stored in the mobile station. Referring again to FIG. 1, registration information 70 represents the registration information list (RIL) stored in mobile station 20. Each base station transmits, on a control channel, registration configuration information which the mobile station can monitor in the mobile station idle state. Some systems may combine the control channel and the paging channel. A mobile station uses the RIL along with the registration configuration information to determine when it should autonomously register. The RIL is a memory means which incorporates a timing mechanism to enable the RIL to set, increment, and monitor timers associated with parameters stored therein. The implementation of such memory is well known in the art and is not critical to the present invention.

Figure 2:
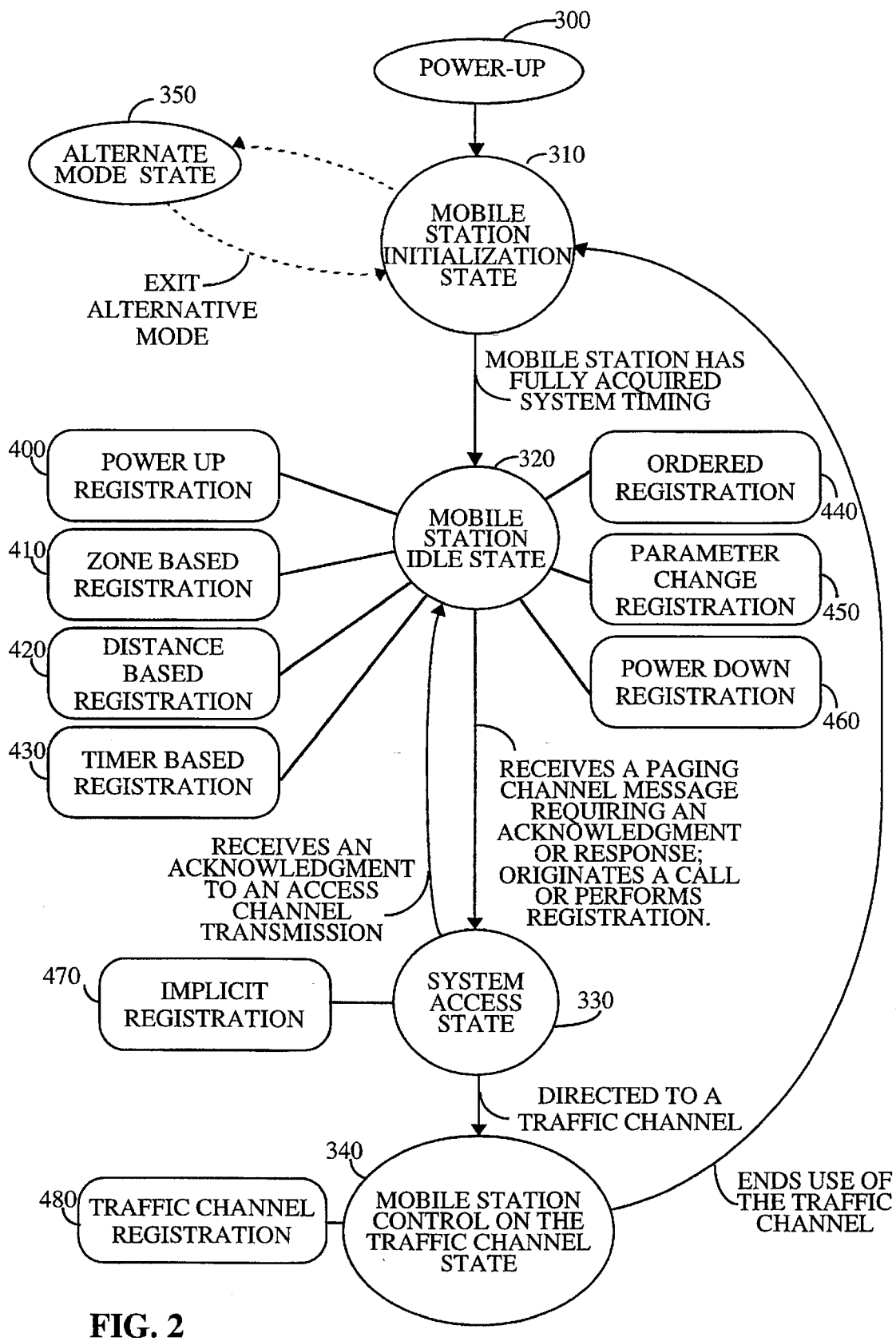
FIG. 2 is a block diagram illustrating the relationship between mobile station states and the registration mechanism.

FIG. 2 illustrates the relationship between the mobile station states and the registration mechanism for the preferred embodiment. The relationship disclosed is one of many possible embodiments. The Comprehensive method of registration disclosed herein, or a subset thereof, can be integrated into many times of operation architecture. Six mobile station states are shown in FIG. 2 enclosed by ovals. Some of the relevant mechanisms by which the mobile station changes states are noted by the statements corresponding to the arrows which indicate transition from one state to another. Power up state 300 is the first state the mobile station enters when power is initially applied. From this state the mobile station enters mobile station initialization state 310. Mobile station initialization state 310 is also the first state that a mobile station capable of multiple modes of operation enters when the mobile station switches from a previous mode of operation, e.g., analog mode, to the present mode of operation to which this registration method is applied, e.g., digital mode, as represented by alternate mode state 350 of FIG. 2. As illustrated in FIG. 2, the mobile station must acquire system timing, scan for control channels, and perform other functions associated with mobile station initialization state 310 before entering mobile station idle state 320. Among the many functions the mobile station can perform from mobile station idle state 320 is the ability to monitor base station registration configuration information and to listen for pages. The mobile station updates and monitors the RIL in the mobile station idle state 320.

From mobile station idle state 320, the mobile station enters system access state 330 to commence communication through a base station. The transition can occur for several reasons including response to a page from the MSC, origination of a call, or registration. If the mobile station enters system access state 330 solely to register it typically returns to mobile station idle state 320 when it receives an acknowledgment from the base station. If there is an incoming or outgoing call, the mobile station in system access state 330 is directed to enter mobile station control on the traffic channel state 340. Upon termination of the communication through mobile station control on the traffic channel state 340, the mobile station returns to the mobile station initialization state 310.

There are nine different registration methods which are indicated on FIG. 2 and described subsequently herein. The seven types of registration which are initiated in mobile station idle state 320 are referred to as explicit forms of registration. Implicit registration 470 is associated with system access state 330 and traffic channel registration 480 is associated with mobile station control on the traffic channel state 340. For the mobile station, registration comprises self identification of the mobile station to the MSC and the setting or resetting of entries in the RIL to reflect this action. The mobile station may also identify the type of registration being performed. For example in the case of a power down registration, the mobile station identifies the type of registration since the actions taken by the MSC are different for this type of registration than for others. A comprehensive method may comprise all of these methods or it may comprise a subset thereof. A base station may command the mobile station to disable some forms of registration through the registration configuration information.

When the mobile station initially receives power or when it has switched from using a different mode of operation, upon first entering mobile station idle state 320 the mobile station autonomously senses the need to perform power up registration 400. The mobile station enters system access state 330 and registers with the base station of the coverage area in which it is located. As described in further detail herein, the mobile station makes an appropriate zone list entry, notes the parameter based registration information, and sets the timer based registration and distance based registration parameters on the RIL. To prevent a mobile station from continually performing power up registration 400 when power is quickly applied and removed, the mobile station can delay some predetermined time interval in idle state 320 before executing power up registration 400. Adding such a delay, for example, would prevent a mobile station installed in a car that is having problems starting from registering repeatedly as the driver turns the car on and off. The time delay can be programmable by the base station or MSC or it can be a stored parameter. Power up registration may be disabled internally or by a base station or MSC. Once power up registration 400 is complete, the mobile station performs other forms of registration based on the RIL stored in its memory and registration configuration information received from the base stations.

In an exemplary cellular system, each base station is assigned to a zone and each zone is contained within a network. In turn each network is contained in a system. Generally a system can refer to the service provider while a network can refer to a subsystem within a system, e.g., a private in-building network contained within a standard public cellular system. System, network, and zone information is relayed on the control channel to the mobile station by a base station as registration configuration information in the form of corresponding identification numbers. Systems and networks are given identification numbers respectively referred to as SID and NID numbers. The purpose of storing the SID and NID numbers is to facilitate mobile station operation across multiple systems and networks. Base stations with contiguous coverage area boundaries which are assigned different zone numbers are not necessarily connected to the same MSC or database. Therefore in a comprehensive scheme, to ensure that a mobile station which has entered an area controlled by another MSC or database with which the mobile station is not currently registered is added to the database of the new MSC, the mobile station must register upon entering the coverage area of a base station which has a SID, NID, or zone number which is not currently stored in the RIL. This action also ensures that an incoming call intended for a mobile station is directed to the MSC currently serving the mobile station.

Registration based on location within a zone, network, or system is referred to as zone based registration 410 and is initiated from mobile station idle state 320 as shown in FIG. 2. A zone entry in the RIL refers to a zone, NID, and SID number triplet assigned to a base station through which the mobile station has registered. Zone based registration 410 occurs one of two ways: the mobile station enters the coverage area of a base station having a zone, NID, and SID number which is not currently a zone entry in the RIL, or a timer expires on a zone entry in the RIL while the mobile station is located in the coverage area of a base station having that zone, NID, and SID number. When a mobile station enters the coverage area of a base station with a zone, NID, and SID number not currently stored in the RIL and registers with that base station, it adds the corresponding zone entry in the RIL with no associated timer. The mobile station sets a timer on other zone entries in RIL which do not already have an associated timer whenever it registers. Upon expiration of a zone entry timer, the corresponding zone entry is deleted from the RIL. If the deletion due to timer expiration occurs while the mobile station is located in the coverage area of a base station with the deleted zone, NID, and SID numbers, the mobile station initiates a zone based registration and re-registers through that base station.

The ability to store multiple zone entries in the zone based registration method as described above reduces registrations made by mobile station traveling along coverage area boundaries. Without this ability a mobile station which passes repeatedly between base station coverage areas assigned to different zones would perform multiple registrations. In the present invention, repeated registrations due to entry into a new zone can happen no more often than is dictated by the zone entry timer period. The associated timers also allow the MSC to reduce the paging region by not paging a mobile station after a predetermined amount of time has passed without a registration from the mobile station. Upon execution of a zone based registration, the mobile station resets the timer based registration and distance based registration parameters on the RIL. The quantity of zone entries or the quantity of separate zone, NID, and SID numbers stored in the mobile station can be constant or programmable by a base station or MSC. Likewise the expiration time may also be constant or programmable by a base station or MSC. It is also envisioned that while the preferred embodiment is described above, other embodiments are possible. For instance a mobile station may set a timer on all zones not having an associated timer when it enters a new zone regardless of whether it registers or not.

The use of zone based registration is best illustrated by example. Referring again to FIG. 1, suppose that mobile station 20 initially registers through base station 60 in zone II through a power up registration. Mobile station 20 stores the zone number and correspond NID and SID numbers as a zone entry in its RIL with no associated timer. Suppose at some time later mobile station 20 passes from zone II into zone I and receives registration configuration information from base station 80 while in the mobile station idle state. The mobile station initiates a zone based registration and registers through base station 80 and stores the new zone entry in its RIL. The mobile station sets a timer on the zone II entry. Now further suppose that mobile station 20 re-enters zone II in the coverage area of base station 60 before the zone II timer expires. When the timer expires on the zone II entry, mobile station 20 re-registers through base station 60, re-enters the corresponding zone list entry with no associated timer, and sets a timer on the zone I entry. Later, however, when the timer expires on the zone I entry, the mobile station does not re-register and simply deletes the zone I entry from its RIL.

Another form of location based registration is distance based registration 420 as shown in FIG. 2. In the conventional fixed zone based method as described above, the zone based registration of the mobile station typically occurs at zone boundaries. In the distance method, a mobile station registration creates a self-centering "floating zone" about the coverage area of the base station in which the mobile station registers. The size of the "floating zone" is determined by a distance value, which is typically communicated to the mobile station by the base station as registration configuration information. The registration configuration information includes, in addition to the distance value, base station location information. In other forms the distance value may be a default value stored at the mobile station or transmitted previously from a base station for ongoing use. Upon execution of a distance based registration, the mobile station updates the zone list and resets the timer based registration and distance based registration parameters on the RIL.

When a mobile station registers for a first time and upon each subsequent registration, the registration configuration information for the base station in which registration occurs is stored in the RIL. Referring to FIG. 3, by the registration of mobile station 100 in coverage area $C1_A$, all base stations within a predetermined range or distance $d_r$ of coverage area $C1_A$ form a paging region for mobile station 100 as indicated by circle 160. All base stations within the paging region are instructed by the MSC to page mobile station 100 when a call is to be directed thereto. In the case where mobile station 100 registers in coverage area $C1_A$, the page is transmitted by the corresponding base stations in each of coverage areas $C1_A$–$C1_S$ within the paging region centered about coverage area $C1_A$.

Figure 3:
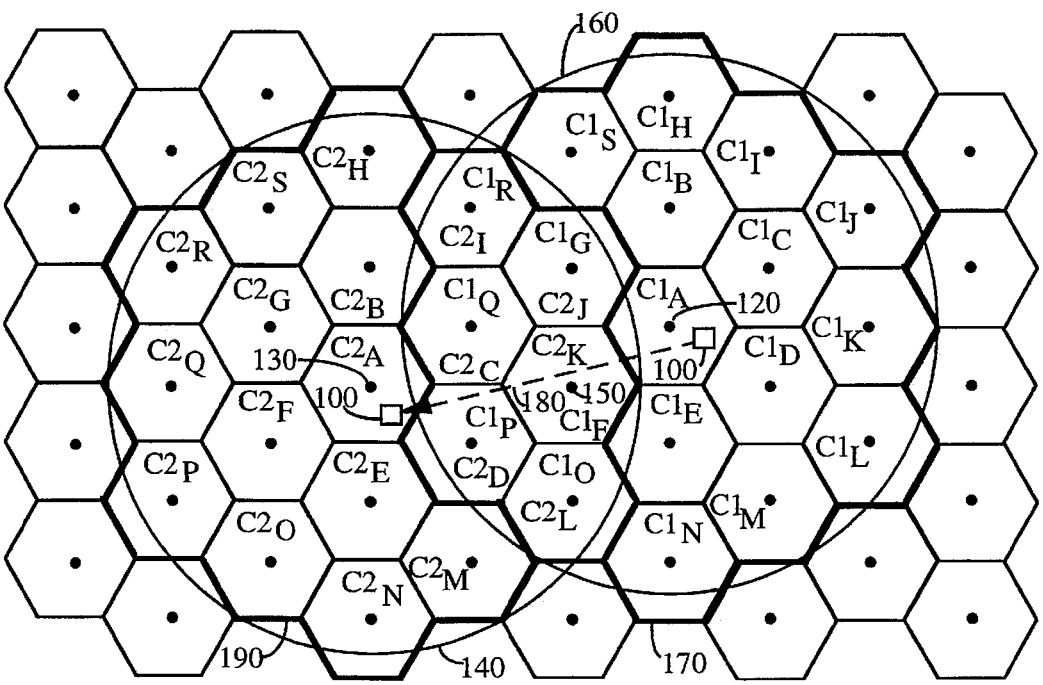
FIG. 3 is a diagram illustrating an exemplary base station structure and mobile station coverage area paging regions for an initial registration and for a distance based registration.

In the example illustrated by FIG. 3, mobile station 100 registers in coverage area $C1_A$. Registration in coverage area $C1_A$ may be caused by any method, e.g., zone based registration or power up registration. The distance based registration process involves retrieving from the RIL the stored registration configuration information for the coverage area in which a previous registration occurred. Registration configuration information is received from the base station for the coverage area in which mobile station 100 is located. Using the method described with reference to equations (4)–(6) the following steps are performed in the mobile station processor to determine whether a registration is required. In accordance with equation (5), the stored latitude is subtracted from the current coverage area latitude to obtain the value Δlat. In accordance with equation (6), the stored longitude is subtracted from the current coverage area longitude, with the result multiplied by the cosine factor, to obtain the value Δlong. In accordance with equation (4), the values Δlat and Δlat are respectively squared, with the squared values summed and the square root of the sum taken to arrive at a resultant distance value $d_m$. The resultant distance value $d_m$ is then compared with the stored distance parameter $d_r$. Should the distance value $d_m$ be greater than or equal to the stored distance parameter $d_r$, mobile station 100 registers as discussed above.

Upon registration in coverage area $C1_A$, mobile station 100 stores the registration configuration information, base station latitude and longitude information, along with the distance value for coverage area $C1_A$. As mobile station 100 travels through the cellular system, for example along the path indicated by dashed line 180, it listens for a mobile station page and for registration configuration information from the base stations of the coverage areas through which it passes. As mobile station 100 moves through the coverage areas, it receives the corresponding base station latitude and longitude information. The current base station latitude and longitude values along with the stored latitude, longitude and distance values are used in accordance with equations (4)–(6) by mobile station 100 to determine whether the distance value $d_m$ exceeds the stored distance value $d_r$.

Should mobile station 100 determine that the distance value $d_m$ exceeds the stored distance value $d_r$, then mobile station 100 again registers. As illustrated in FIG. 3, when mobile station 100 enters coverage area $C2_A$ in which base station 130 is located a distance greater than or equal to a distance $d_r$ from base station 120 of coverage area $C1_A$, mobile station 100 registers in coverage area $C2_A$. In registering in coverage area $C2_A$, all base stations within a predetermined distance $d_{r2}$ of base station 130 of coverage area $C2_A$ form a new "floating zone" as indicated by circle 140. All base stations within each coverage area within the new paging region are instructed by the MSC to page mobile station 100 when a call is to be directed thereto. As was for the previous registration in coverage area $C1_A$ the page is also transmitted by a base station in each of coverage areas $C2_A$–$C2_S$ within the new region centered about coverage area $C2_A$.

Circles 140 and 160 are merely representative of the "floating zone" boundaries associated with mobile station 100. A more accurate representation of the boundaries of the self-centering "floating zones" are illustrated by darker coverage area boundary lines 170 and 190 respectively associated with each of circles 160 and 140.

It should be noted that coverage areas $C1_A$, $C1_F$, and $C1_P$ through which mobile station 100 passes as it travels along the path indicated by dashed line 180 of FIG. 3 are assumed to be in the same zone. If they did not have the same zone, NID, and SID numbers then mobile station 100 would have performed a zone based registration and would have reset the "floating zone" of the distance based registration to be centered about that base station.

As discussed above, the base stations transmit latitude and longitude information for purposes of registration determination. It is envisioned that other coordinate systems may be used in a similar manner. For example, a cellular system grid pattern or coordinate system may be constructed with base stations transmitting corresponding grid coordinates.

Since a mobile station within a cellular system may be stationary for an extended period of time, change in location is not sufficient as the only stimulus for registration. Therefore the present invention also incorporates as an integral part of the registration scheme, the timer based method described above. Timer based registration 430 is initiated from the mobile station idle state 320 as shown in FIG. 2 and causes the mobile station to register at regular intervals if no other form of registration occurs. Its use allows the MSC to automatically deactivate a particular mobile station from its paging database after a predetermined amount of time has passed without a registration from that mobile station thus, for example, preventing a mobile station that failed to execute a power down registration from being uselessly paged. The expiration time for the timer based registration is typically long compared to the other timers such as the zone entry expiration timer and is reset after each successful explicit or implicit registration. The expiration time may be constant or programmable by a base station or MSC. The timer may be disabled by the base station or MSC for some period of time. Upon execution of a timer based registration, the mobile station updates the zone list, and resets the timer based registration and distance based registration parameters on the RIL.

Referring again to mobile station 20 of FIG. 1 and the example presented for zone based registration, the mechanism of timer based registration becomes more evident. The expiration time for timer based registration is set when mobile station 20 initiates the power up registration with the base station in zone II. Upon entering zone I, the timer is reset when mobile station 20 performs a zone based registration with base station 80. In the scenario, mobile station 20 re enters the coverage area of base station 60 and becomes stationary for a long period of time. Mobile station 20 waits to register with base station 60 until the zone II entry timer expires in its RIL at which time the timer based timer is reset once more. Eventually the zone I entry timer expires and the entry is deleted from the RIL. Suppose that mobile station 20 remains stationary and that no other stimulus initiates a registration. Both MSC 40 and mobile station 20 monitor the time which has elapsed since the last registration. The time for timer based registration ultimately expires in mobile station 20 and a timer based registration is performed before MSC 40 deactivates the mobile station 20 entry from its database.

In a working cellular system, the reciprocating function to the autonomous mobile station registration can further reduce paging and increase the reliability of the system. The comprehensive registration scheme of the present invention provides, in addition to the mobile station initiated registrations, a mechanism to allow an MSC or base station to direct a mobile station to perform a registration on command. A mobile station in mobile station idle state 320 can be commanded by a base station or MSC to register via execution of an ordered registration 440 as referred to FIG. 2. Such a registration might occur if the timer expired on a mobile station entry in the MSC database and the MSC wanted to assure that the mobile station was not located within its boundaries before deactivating its entry from the database. The MSC can also use an ordered registration to confirm a partial or failed power down registration attempt discussed subsequently herein. This message is essential in allowing a complete registration transaction following an exchange between a mobile station and a base station which is not considered an implicit registration. Upon execution of an ordered registration, the mobile station updates the zone list and resets the timer based registration and distance based registration parameters on the RIL.

To reliably page a mobile station, the mobile station must notify the MSC if the mechanism by which the mobile station receives pages changes due to stimulus of which the base station and MSC are unaware. Therefore a parameter change registration 450 is initiated from the mobile station idle state 320 as shown in FIG. 2 upon change of certain parameters in the mobile station. Upon execution of a parameter based registration, the mobile station notes the parameter based registration information, updates the zone list, and resets the timer based registration and distance based registration parameters on the RIL. If at the time of a parameter based registration the mobile station has multiple zone entries stored, it must delete them and leave only the entry that is updated by the parameter based registration. As discussed above, base stations corresponding to other zone entries may not be connected to the same MSC or database. If the mobile station were to re-enter a zone in which the mobile station had registered previous to the parameter change, the database would not be accurate and the paging mechanism may be faulty. Deleting all but the current entries on the zone list ensures that the mobile station performs a zone based registration upon entering a new zone and therein notifies the MSC of the current parameter configuration.

For example, one parameter which when changed initiates a parameter based registration is the slotted mode status parameter of a mobile station. A hand-held mobile station may assume a slotted mode wherein the mobile station in the idle state only monitors the paging channel during specific time slots. The MSC must know the slot cycle of a mobile station using slotted mode so that it can direct the base stations to attempt to page the mobile station during the time when the mobile station is monitoring the paging channel. Slotted mode is used to conserve power in hand-held mobile stations where power consumption is crucial. Generally in a mobile station which is installed in a car, slotted mode is not used since power conservation is not critical. To illustrate the stimulus of a parameter based registration, assume that a hand-held mobile station is provided with a car kit assembly and that the hand-held receives car battery power when installed therein. Further assume slotted mode is only used when the hand-held is not installed in the car kit. If the hand-held unit in the mobile station idle state is removed from the car kit and therefore enters slotted mode, it must perform a parameter change based registration to notify the MSC of its change of status and corresponding slot cycle.

To prevent the unnecessary paging by the MSC of a mobile station that is not currently in service, the comprehensive scheme of the present invention employs a mechanism for the mobile station to alert the MSC that it will no longer be operating in the form of a power down registration. Power down registration 460 as shown in FIG. 2 is initiated from the mobile station idle state 320 when the user directs the mobile station to power off. The mobile station only attempts a power down registration if it has previously registered in the system as it makes no sense to inform the MSC to deactivate the mobile stations entry if the entry was never activated. thus preventing the mobile station from performing many power down registrations as power is quickly applied and removed.

If power-down registration is performed, the mobile station does not power down until after completing the registration attempt. Power down registration is different than the other forms of registration in that it notifies the MSC via the base station of the coverage area in which it is located that it is going off the air and that the corresponding entry in the MSC database can be deactivated rather than updating the information in the MSC for use in future paging attempts. Power down registration also clears entries in the RIL since the parameters stored at power down may not be applicable at power up. The ability to disable power down registration may be given to the mobile station itself or to a base station or MSC.

The success of a power down registration is inherently unpredictable in that the user may power down the radio after it has lost contact with the base station. For example, a mobile station mounted in a car may be parked in a garage where coverage is blocked before removing power and initiating the power down registration. It should be noted however that successful power down registrations eliminate unnecessary paging that would have otherwise occurred and that a failed power down registration attempt is, in the system, equivalent to not attempting such a registration. Therefore, even if the success rate of power down registrations is moderate, the benefits of the mechanism will be positive over all to the system.

The mobile station uses the system access state 330 of FIG. 2 to communicate with the base station in which it is located. As noted in FIG. 2, among the reasons that the mobile station enters system access state 330 are response to a page or initiation of a call. When a mobile station enters the system access state and successfully communicates certain messages to the base station of the coverage area in which it is located, the base station implicitly knows that the mobile station is located within its coverage area and can register this information to the MSC. Referring to FIG. 2 implicit registration 470 in system access state 330 represents the registration that occurs through use of the access channel in those cases where the access state is entered for some other reason than to perform an explicit registration. Upon execution of an implicit registration, the mobile station updates the zone list and resets the timer based registration and distance based registration parameters on the RIL. Since it resets the information in the RIL due to necessary communication with the base station that occurs independent of any registration stimulus, the use of implicit registration reduces the number of explicit registrations.

A mobile station is directed to mobile station control on the traffic channel state 340 from system access state 330 in the event of mobile terminated or mobile initiated call as indicated on FIG. 2. As described above upon entry into mobile station control on the traffic channel state 340, the mobile station has been registered by implicit registration 470 of the access state and all appropriate RIL entries have been reset. As the mobile station remains in mobile station control on the traffic channel state 340, the system tracks the location of the mobile station during the call in order to assign that mobile station to the base station of the coverage area in which it is located. Therefore during mobile station control on the traffic channel state 340, there is no need to perform an explicit registration since the base station is aware to any new situation which requires registration of the mobile station and the registration timers are disabled. The mobile station can be notified to update the appropriate RIL entries in response to registration with the MSC by the base station through which it is communicating via traffic channel registration without any registration message being sent by the mobile station. At the termination of mobile station control on the traffic channel state 340, the mobile station normally enters mobile station initialization state 310. However if the termination is the result of a mobile station power down, the mobile station indicates the power down to the base station prior to actually powering down thus performing the equivalent of a power down registration as previously described as a special case of traffic channel registration. Subsequently when the mobile station re-enters the mobile station idle state 320, the RIL has been updated to reflect the notification of registration that the mobile station has received during the mobile station control on the traffic channel state thereby avoiding explicit registrations immediately after termination of a call and reducing the total number of registrations.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of reducing the number of base station pages required to communicate a page to a mobile station located within a system of base stations controlled by a system controller, comprising the steps of:

storing at said system controller a list of mobile station registration information corresponding to said mobile station, said registration information comprising a location parameter for a base station through which said mobile station most recently registered;

identifying a set of base stations located within a fixed distance from said base station through which said mobile station most recently registered by calculating distances between said base station and every other base station in the system and selecting only those base stations having distances less than or equal to a predetermined maximum distance threshold; and paging said mobile station in said set of base stations when a message is to be directed thereto.

2. The method of reducing the number of base station pages of claim 1 further comprising the steps of setting a timer associated with said list of mobile station registration information corresponding to said mobile station;

resetting said associated timer when a registration message is received from said mobile station; and deleting said list of mobile station registration information corresponding to said mobile station when said timer expires.

3. The method of reducing the number of base station pages of claim 1 further comprising the steps of:

receiving from said mobile station a registration message indicating that said mobile station is no longer in service; and deleting said list of mobile station registration information corresponding to said mobile station.

4. The method of reducing the number of base station pages of claim 1 wherein said mobile station establishes sustained communication with a first base station of said system of said base stations, further comprising the step of receiving from said first base station updated registration information corresponding to said mobile station at the completion of said sustained communication and re-registering said mobile station using said updated registration information.

5. The method of reducing the number of base station pages of claim 1 further comprising the steps of:

setting a timer associated with said list of mobile station registration information corresponding to said mobile station;

resetting said associated timer when a registration message is received from said mobile station; and disabling said associated timer when said mobile station enters a state of sustained communication.

6. The method of reducing the number of base station pages of claim 1 wherein said mobile station establishes sustained communication with a series of said base stations, further comprising the step of receiving from a final base station updated registration information corresponding to said mobile station at the completion of said sustained communication, wherein said final base station corresponds to a base station through which said mobile station is communicating at the completion of said sustained communication and re-registering said mobile station using said updated registration information.

7. A method of reducing the number of base station pages required to communicate a page to a mobile station located within a system of base stations controlled by a system controller wherein each base station is associated with a corresponding zone of base stations, comprising the steps of:

storing at said system controller a list of mobile station registration information corresponding to said mobile station, said registration information comprising a location parameter and a zone information parameter for a first base station associated with a first zone through which said mobile station most recently registered;

identifying a set of base stations located within said first zone and within a fixed distance from said base station through which said mobile station most recently registered by calculating distances between said base station and every other base station in the system and selecting only those base stations having distances less than or equal to a predetermined maximum distance threshold and lying within said first zone; and paging said mobile station in said set of base stations when a message is to be directed to said mobile station.

8. The method of claim 7 of reducing the number of base station pages wherein said zone information comprises a list of base stations sharing a common zone.

9. The method of reducing the number of base station pages of claim 7 further comprising the steps of:

setting a timer associated with said list of mobile station registration information corresponding to said mobile station; and paging said mobile station in a set of base stations in said first zone of base stations located within a fixed distance from said first base station if said timer has not expired when a message is to be directed to said mobile station.

10. The method of reducing the number of base station pages of claim 7 further comprising the steps of:

storing with said list of mobile station registration information corresponding to said mobile station additional registration information comprising a location parameter and a zone information parameter for a second base station associated with a second zone when said mobile station registers through said second base station; and setting a timer associated with said registration information corresponding to said first base station;

wherein said step of paging said mobile station in said set of base stations in said first zone of base stations is performed only if said timer has not expired.

11. The method of reducing the number of base station pages of claim 10 further comprising the step of deleting from said list of mobile station registration information corresponding to said mobile station, said registration information corresponding to said first base station when said timer has expired.

12. The method of reducing the number of base station pages of claim 10 further comprising the step of paging said mobile station in a set of base stations in said second zone of base stations located within a second fixed distance from said second base station when said message is to be directed to said mobile station.

13. A method of reducing the number of base station pages required to communicate a page to a mobile station located within a system of base stations controlled by a system controller wherein each base station is associated with a corresponding zone of base stations, comprising the steps of:

storing at said system controller a list of mobile station registration information corresponding to said mobile station comprising an identity of a first base station associated with a first zone, wherein said first base station is the base station through which said mobile station most recently registered;

identifying a set of base stations located within said first zone and within a fixed distance from said base station through which said mobile station most recently registered by calculating distances between said base station and every other base station in the system and selecting only those base stations having distances less than or equal to a predetermined maximum distance threshold and lying within said first zone;

storing at said system controller a paging region list corresponding to said first base station wherein said paging region list comprises said set of base stations; and paging said mobile station in said set of base stations identified in paging region list when a message is to be directed to said mobile station.

14. The method of claim 7 of reducing the number of base station pages, further comprising the steps of:

receiving at said system controller a power down registration from said mobile station; and deleting at said system controller said list of mobile station registration information corresponding to said mobile station.

15. The method of claim 10 of reducing the number of base station pages, further comprising the steps of:

receiving at said system controller a power down registration from said mobile station; and deleting at said system controller said registration information corresponding to said first base station.

16. A method of reducing the number of base station pages required to communicate a page to a mobile station located within a system of base stations controlled by a system controller wherein each base station is associated with a corresponding zone of base stations, comprising the steps of:

storing at said system controller a list of mobile station registration information corresponding to said mobile station, said registration information comprising a zone information parameter for a first base station associated with a first zone through which said mobile station most recently registered;

receiving at said system controller a registration message from said base station through a second base station in a second zone;

setting a timer associated with said zone information parameter information corresponding to said first base station; and paging said mobile station in a set of base stations in said first zone of base stations if said timer has not expired when a message is to be directed to said mobile station.

17. A method for reducing the number of base stations pages required to communicate a page to a mobile station located within a system of base stations controlled by a system controller, comprising the steps of:

storing at said system controller a list of mobile station registration information corresponding to said mobile station, said registration information comprising a locating parameter for a base station through which said mobile station most recently registered;

setting a timer associated with said list of mobile station registration information corresponding to said mobile station;

resetting said associated timer when a registration message is received from said mobile station; and if said timer expires before the step of resetting, identifying a set of base stations located within a fixed distance from said base station through which said mobile station most recently registered by calculating distances between said base station and every other base station in the system and selecting only those base stations having distances less than or equal to a predetermined maximum distance threshold and paging said mobile station in said set of base stations.

18. The method of reducing the number of base station pages of claim 17 further comprising the steps of updating said list of mobile station registration information corresponding to said mobile station if said mobile station responds to said page; and deleting said list of mobile station registration information corresponding to said mobile station if said mobile station fails to respond to said page.

* * * * *